United States Patent
Shah et al.

(10) Patent No.: US 9,817,918 B2
(45) Date of Patent: Nov. 14, 2017

(54) SUB-TREE SIMILARITY FOR COMPONENT SUBSTITUTION

(75) Inventors: Amip J Shah, Santa Clara, CA (US); Manish Marwah, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1490 days.

(21) Appl. No.: 13/007,175

(22) Filed: Jan. 14, 2011

(65) Prior Publication Data

US 2012/0185489 A1    Jul. 19, 2012

(51) Int. Cl.
| | |
|---|---|
| *G06F 7/00* | (2006.01) |
| *G06F 17/30* | (2006.01) |
| *G06Q 10/06* | (2012.01) |
| *G06Q 30/06* | (2012.01) |
| *G06F 13/14* | (2006.01) |

(52) U.S. Cl.
CPC ....... *G06F 17/30961* (2013.01); *G06Q 10/06* (2013.01); *G06Q 30/06* (2013.01); *Y02P 90/84* (2015.11)

(58) Field of Classification Search
CPC .......... G06F 17/3071; G06F 17/30221; G06F 17/30327; G06F 17/30961; G06F 17/30244; G06F 17/30247; G06F 17/30265; G06F 17/3028; G06F 17/30598; G06F 17/2211; G06F 17/30442; G06F 17/30625; G06F 17/227; G06F 17/30495
USPC ....... 707/737, 772, 784, 797, 802, 803, 899, 707/706–709, 723, 778, 829, 956, 707/999.102, 748, E17.017, 711, 751, 707/769, 915, 999.006, 999.1, E17.012, 707/E17.087, E17.089, 999.107, E17.091, 707/714; 370/252, 335, 342
See application file for complete search history.

(56) References Cited

U.S. PATENT DOCUMENTS

| | | | |
|---|---|---|---|
| 5,852,560 | A | 12/1998 | Takeyama et al. |
| 6,049,797 | A | 4/2000 | Guha et al. |
| 6,415,283 | B1 | 7/2002 | Conklin |
| 6,490,569 | B1 | 12/2002 | Grune et al. |
| 6,513,059 | B1 * | 1/2003 | Gupta .............. G06F 9/4862 707/E17.111 |
| 6,532,464 | B1 | 3/2003 | Miyamoto |
| 6,564,197 | B2 | 5/2003 | Sahami et al. |
| 6,691,044 | B2 | 2/2004 | Kobayashi et al. |

(Continued)

FOREIGN PATENT DOCUMENTS

| | | |
|---|---|---|
| WO | WO0041114 | 7/2000 |
| WO | WO0126044 | 4/2001 |

OTHER PUBLICATIONS

Bouley, Dennis, "Estimating a Data Center's Electrical Carbon Footprint," research paper.

(Continued)

*Primary Examiner* — Heather Herndon
*Assistant Examiner* — Cecile Vo
(74) *Attorney, Agent, or Firm* — Trenner Law Firm, LLC (57) ABSTRACT

Systems and methods of determining sub-tree similarity for component substitution. A method includes assigning a similarity metric to a plurality of trees stored in computer-readable media. The method also includes constructing a distance matrix in computer-readable media, the distance being between sub-trees. The method also includes correlating sub-trees in the computer-readable media based on the distance matrix.

17 Claims, 9 Drawing Sheets

(56) References Cited

U.S. PATENT DOCUMENTS

| | | | |
|---|---|---|---|
| 6,742,001 | B2 | 5/2004 | Ripley |
| 6,757,242 | B1 | 6/2004 | Wang et al. |
| 6,862,540 | B1 | 3/2005 | Welch |
| 7,007,069 | B2 | 2/2006 | Newman et al. |
| 7,058,644 | B2 | 6/2006 | Patchet et al. |
| 7,151,752 | B2 | 12/2006 | Fourin et al. |
| 7,197,504 | B1 | 3/2007 | Runkler et al. |
| 7,272,607 | B2 | 9/2007 | Udeshi et al. |
| 7,287,026 | B2 | 10/2007 | Oommen |
| 7,310,624 | B1 | 12/2007 | Aggarwal et al. |
| 7,366,110 | B2 | 4/2008 | Gillespie et al. |
| 7,415,418 | B2 | 8/2008 | Zimmerman |
| 7,536,476 | B1 | 5/2009 | Alleyne |
| 7,620,632 | B2 | 11/2009 | Andrews |
| 7,634,464 | B2 | 12/2009 | Chen et al. |
| 7,668,100 | B2 | 2/2010 | Balasaygun et al. |
| 7,707,085 | B2 | 4/2010 | Sakurai et al. |
| 7,725,499 | B1 * | 5/2010 | von Lepel ............... G06Q 30/02 707/791 |
| 7,801,878 | B2 | 9/2010 | Hayes et al. |
| 7,831,416 | B2 | 11/2010 | Grichnik et al. |
| 7,958,257 | B2 | 6/2011 | Gershinsky et al. |
| 8,145,732 | B2 | 3/2012 | Kumar et al. |
| 8,352,465 | B1 * | 1/2013 | Jing .................... G06F 17/30867 707/723 |
| 2002/0032684 | A1 | 3/2002 | Kobayashi et al. |
| 2002/0099587 | A1 | 7/2002 | Kakihana et al. |
| 2002/0116161 | A1 | 8/2002 | Freeman et al. |
| 2004/0172442 | A1 | 9/2004 | Ripley |
| 2004/0181526 | A1 | 9/2004 | Burdick et al. |
| 2005/0021490 | A1 | 1/2005 | Chen et al. |
| 2005/0027681 | A1 | 2/2005 | Bernstein et al. |
| 2005/0086208 | A1 | 4/2005 | Bestgen et al. |
| 2007/0260595 | A1 * | 11/2007 | Beatty ................ G06F 17/30964 |
| 2007/0294291 | A1 | 12/2007 | Sasaki et al. |
| 2008/0154926 | A1 | 6/2008 | Newman |
| 2008/0250357 | A1 * | 10/2008 | Lee ..................... G06F 17/2211 715/853 |
| 2009/0083390 | A1 | 3/2009 | Abu-Ghazaleh |
| 2009/0125529 | A1 | 5/2009 | Vydiswaran et al. |
| 2009/0248624 | A1 | 10/2009 | Lammel et al. |
| 2009/0313041 | A1 | 12/2009 | Eder |
| 2010/0076687 | A1 | 3/2010 | DeYoung et al. |
| 2010/0094885 | A1 | 4/2010 | Andrews |
| 2010/0100403 | A1 | 4/2010 | Pollock et al. |
| 2010/0145629 | A1 | 6/2010 | Botich |
| 2010/0165886 | A1 | 7/2010 | Borril |
| 2010/0179794 | A1 | 7/2010 | Shah et al. |
| 2010/0223211 | A1 | 9/2010 | Johnson et al. |
| 2010/0235300 | A1 | 9/2010 | Feingold |
| 2010/0332444 | A1 | 12/2010 | Akatsu et al. |
| 2010/0332475 | A1 | 12/2010 | Birdwell et al. |
| 2011/0161311 | A1 | 6/2011 | Mishne et al. |
| 2011/0173197 | A1 | 7/2011 | Mehta et al. |
| 2011/0307468 | A1 | 12/2011 | Duan et al. |
| 2012/0106367 | A1 * | 5/2012 | Barkol ............... G06F 17/30961 370/252 |
| 2012/0185422 | A1 | 7/2012 | Shah et al. |
| 2012/0185477 | A1 | 7/2012 | Shah et al. |
| 2012/0185489 | A1 | 7/2012 | Shah et al. |
| 2012/0185508 | A1 | 7/2012 | Shah et al. |

OTHER PUBLICATIONS

Ross, et al. "Collaborative Filtering and Carbon Footprint Calculation," Department of Informatics, May 17-19, 2010, pp. 1-6, University of California.

Cai, et al., "A Singular Value Thresholding Algorithm for Matrix Completion."

Romanowski, "A Data Mining Approach to Forming Generic Bills of Materials in Support of Variant Design Activities."

Torsello, "Four Metrics for Efficiently Comparing Attributed Trees," Aug. 23-26, 2004, vol. 2, pp. 467-470.

Romanowski, "On Comparing Bills of Materials: a Similarity/distance Measure for Unordered Trees."

"Eco-indicator 95" available at http://www.pre.nl/eco-indicator95/eco-indicator95.htm#Background.

Cheng, et al., "A Web Service Framework for Environmental and Carbon Footprint Monitoring in Construction Supply Chains," available at http://eil.stanford.edu/publications/jack_cheng/jack_greenSCOR_web_final.pdf.

Koutitas; "Low Carbon Network Planning," Apr. 12-15, 2010; pp. 411-417.

Gautam, et al. "Context-based Similarity Measures for Categorical Databases," Publication Date: 2000; pp. 201-210.

Tae-Wan Ryu and Eick, "Similarity Measures for Multi-valued Attributes for Database Clustering," available at http://citeseerx.ist.psu.edu/viewdoc/download?doi=10.1.1.54.3544&rep=rep1&type=pdf.

Cai and Yau, "Categorical Clustering by Converting Associated Information," Publication Date: 2006; pp. 31-36.

Haung, X., et al., "Clustering Graphs for Vizualization via Node Similarities", Journal of Visual Languages and Computing, 17, 2006, 225-253.

Jeong Min Moon, et al., "Life Cycle Assessment Through On-Line Database Linked with Various Enterprise Database Systems," The International Journal of Life Cycle Assessment, vol. 12, No. 7, 488-496, DOI: 10, 1065/lca2006.10.276, Publication Date: 2003; vol. 8; on pp. 226-234.

Sustainable Minds Release 1.0 Offers Product Life Cycle Assessment for Autodesk Inventor Users Import of Bill of Materials Data Providers Seamless Interoperability, http://www.pitchengine.com/pitch/30787, Oct. 27. 2009.

Laurin, L.; et al., "Automated LCA-A Practical Solution for Electronics Manufacturers," http://www.ieeexplore.ieee.org/xpl/mostRecentIssue.jsp?punumber=10977, May 8-11, 2006.

Sundaravaradan, N., et al., "Discovering Life Cycle Assessment Trees from Impact Factor Databases", Proceedings of the Twenty-Fifth AAAI Conference on Artificial Intelligence, pp. 1415-1420, Aug. 7-11, 2011.

Romanowski, C., et al., "Data Mining in an Engineering Design Environment: OR Applications from Graph Matching", Computers & Operations Research, 33, 2006, pp. 3150-3160.

Sundaravaradan, N., et al., "Data Mining Approaches for Life Cycle Assessment", IEEE ISSST, May 16-18, 2011.

Delisle, R., et al., Induction of Decision Trees via Evolutionary Programming, J. Chem., Inf. Comput. Sci. 2004, 44, pp. 862-870.

Boriah, Similarity Measures for Categorical Data: A Comparative Evaluation, 2008 (12 pages).

Shasha, Correspondence—Exact and Approximate Algorithms for Unordered Tree Matching, IEEE Transactions on Systems, Man, and Cybernetics, vol. 24, No. 4, Apr. 1994 (11 pages).

* cited by examiner

SUB-TREE SIMILARITY FOR COMPONENT SUBSTITUTION

CROSS-REFERENCE TO RELATED APPLICATIONS

This patent application is related to U.S. patent application Ser. Nos. 13/007,229, 13/007,252, 13/007,073, 13/007,270, 13/007,125, 13/007,152, each filed Jan. 14, 2011 and U.S. patent application Ser. No. 13/282,388 filed Oct. 26, 2011, and each incorporated by reference for the disclosed subject matter as though fully set forth herein.

BACKGROUND

Manufacturers in various industries use proprietary databases to track the price of individual components used during manufacturing, to determine how the change in price of various components impacts the overall price for their products. For example, a packaging manufacturer may maintain a database including price to obtain the stock materials (e.g., cardboard, plastic, and ink), produce the packaging (e.g., including cutting the cardboard, extruding the plastic, and printing the labels), and delivering the packaging to their customers. When the price of a component changes (e.g., fuel prices rise, thereby raising the price to obtain the stock materials and delivery), the manufacturer is able to use their database to quickly determine the overall impact the component change in price has on the overall price of their product so that the manufacturer can raise the price of their product (or make other adjustments) in a timely manner to reduce or eliminate any impact on their profit.

Manufacturers can also consider the impact of their products on the environment and other parameters. Electronics devices (e.g., computers, printers, and mobile phones), can be a concern because these devices typically have very short lifetimes and are commonly discarded by consumers when newer devices become available. For example, users may discard their mobile phone every two years when they are offered free or discounted equipment to renew their mobile phone contract with their carrier. Consumers also may discard their computers, televisions, and other appliances after only a few years of service, often because it is less expensive to replace than to repair.

Life Cycle Analysis (LCA) databases are beginning to become publicly available. For example, the Open LCA initiative is a public domain data sharing protocol. These databases include, for example, data related to the mining efforts of raw materials, in addition to the disposal/recycling efforts to handle the components of products after consumers discard the products. These databases have thus far experienced limited adoption.

The databases include vast amounts of data that can be useful to manufacturers given the component breakdown of current products. It is said, for example, that a product as simple as a pen can include over 1500 parameters when considered on a cradle-to-grave basis.

These databases provide no analysis of the data for the manufacturer. For example, while a user may be able to use these databases to check whether the use of a particular plastic might have a bigger impact than another type of plastic, the database still provides no other information that the manufacturer can use to make, e.g., business decisions.

DETAILED DESCRIPTION

A user may use conventional databases to determine whether a component in a product might have a higher price or a bigger impact than another component. But manufacturing decisions can be more complex than this. Manufacturers may take into consideration a wide variety of characteristics of many different components. Other factors that may also be considered include the intended use of the product, availability of components, customer demand, regulations and laws, to name only a few examples.

As used herein, the term "includes" means includes but not limited to, the term "including" means including but not limited to. The term "based on" means based at least in part on.

In manufacturing, for example, simply substituting a plastic component for a metal component in a product because it has a lower environmental impact may not be possible based on one or more other consideration. For example, a certain type of plastic may indeed have a lower environmental impact, but lacks durability (affecting customer satisfaction and/or warranty). Therefore, the plastic may not be a suitable substitution for the metal component. In another example, the plastic may be more expensive than the metal, or fail on some other parameter. Decisions to substitute components cannot be made by simply consulting a database, without some analysis of many different information paths.

Briefly, systems and methods are provided herein that enable large-scale data analysis to enable informed decisions. In an example, a system and method described herein enable automated large-scale data analysis. It is noted that although the systems and methods are described herein with reference to the design and manufacture of an electronic device, the systems and methods can broadly be applied to the design and implementation of any of a wide range of different types of devices and/or services (generally referred to herein as the "system under consideration").

An example of a system includes a computer readable storage to store at least one system tree having a plurality of nodes. The system tree may be stored in a data structure (e.g., a database). Each node in the system tree represents a characteristic of a component. For example, a system tree for a new computer may include a keyboard node, a motherboard node, a hard disk drive node, and a display node. Each node may also include child nodes. For example, the motherboard node may also include child nodes for motherboard components, such as the onboard memory, and processor. These nodes may make up so-called "sub-trees." Sub-trees refer to a group of nodes. For example, a sub-tree may include all of the nodes of a motherboard (including processor, memory, computer board, etc.). Another sub-tree may include all of the nodes of a monitor (including display, housing, cords, etc.).

The database may include information about price of the product, environmental impact, performance, product warranty, customer satisfaction, among others, for each of the nodes in the tree. The information may be referred to generally as "cost." That is, the term "cost" may include price, carbon footprint, energy consumption (e.g., kilowatt hours), number of warranty calls and/or price associated with those warranty calls, and any other suitable metric for characterizing different components.

An analysis engine is operatively associated with the computer readable storage to compare the system tree with other trees. For example, the analysis engine may compare a sub-tree of the system tree for the new computer with other sub-trees for other computers or devices. The analysis engine may determine that the other sub-trees (e.g., the motherboard) for a laptop computer, desktop computer, and netbook computer, offer suitable substitutions.

Based on sub-tree similarity, at least one sub-tree (or node(s) from a sub-tree) may be substituted or replaced in the system tree based on another tree. For example, if the manufacturer is seeking to produce a "green" or "designed for the environment" computer, the motherboard sub-tree or processor node in the system tree may be replaced with the motherboard sub-tree or processor node from one of the more energy efficient laptop or netbook computers.

Similarity measures for continuous (and ordinal) data are straightforward. Typically the L1 norm (Manhattan distance) or L2 norm (Euclidean distance) are used. However, no such universal measures exists for categorical data. Prior solutions for comparing sub-trees in databases are manual, wherein a domain expert examines the sub-trees and determines similarity.

Exact correlation of trees is straight-forward. For example, an algorithm based on a depth first search (DFS) traversal of the trees may be used to compare each of the nodes in the trees. Approximate correlation of the trees is a more challenging problem. Further, unordered trees (where the order of the child nodes is insignificant) are harder to correlation than ordered trees. The trees discussed herein are typically unordered, since the order of the child nodes does not matter.

The systems and methods disclosed herein may be used to compute similarity between sub-trees in databases. Techniques which may be implemented include, but are not limited to, a) domain-based rules, b) attribute-based rules, and c) model-based rules.

In an example, two sub-trees are considered similar if they are interchangeable in a tree. Techniques and methods disclosed herein may be used to quantitatively determine similarity between two such sub-trees. Further, given a particular sub-trees, these techniques and methods may be used, for example, to obtain a list of k most similar sub-trees or nodes of the sub-trees from a specific database.

In addition, nodes that are found to be similar may also be rated. A higher rating may indicate a better candidate for substitution. For example, the motherboard node for the netbook computer may receive a higher rating for price than the desktop computer, because the price of the motherboard in the netbook computer is lower than the price of the motherboard in the desktop computer. But the motherboard node of the laptop computer may receive a higher rating than the desktop computer for environmental impact, because the processor in the laptop computer is more energy efficient than the processor in the desktop computer. The processor in one type of laptop computer may be made of more environmentally friendly components than the processor in another laptop computer.

The systems and methods provided herein determine sub-tree to enable node comparison. Understanding sub-tree aids in finding suitable substitutions, and for clustering nodes or applying other analysis where a distance metric between nodes can be implemented. The node comparison may be utilized for component substitution based on a knowledge base of information for existing components, to meet or exceed customer expectations, marketing goals, environmental impact, and/or other considerations for the system, without the need to develop new components.

Figure 1A:
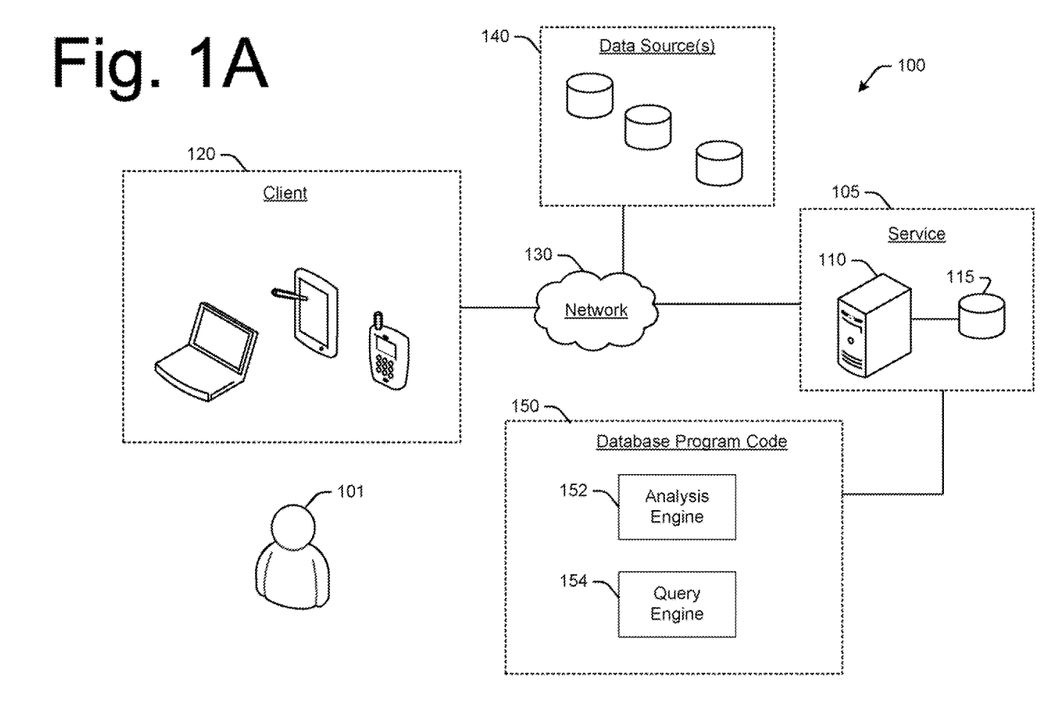
FIG. 1A is a high-level block-diagram of an example computer system that may implement sub-tree similarity for component substitution.

FIG. 1A is a high-level block-diagram of an example computer system 100 which may implement sub-tree for component substitution. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be a data processing service executing on a host 110 configured as a server computer with computer-readable storage 112. The client 120 may be any suitable computer or computing device (e.g., a mobile device) capable of accessing the host 110. Host 110 and client 120 are not limited to any particular type of devices. It is also possible for the host 110 and client 120 to be the same device (e.g., a kiosk platform). Although, it is noted that the database operations described herein which may be executed by the host 110 are typically better performed on a separate computer system having more processing capability, such as a server computer or plurality of server computers. The user interface may be provided on any computing device for providing data to, and receiving data from, service 105.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be a cloud-based service, wherein the host 110 is at least one server computer in a cloud computing system. The host 110 may be provided on the network 130 via a communication connection, such as via an Internet service provider (ISP). In this regard, the client 120 is able to access host 110 directly via the network 130, or via an agent, such as a network site. In an example, the agent may include a web portal on a third-party venue (e.g., a commercial Internet site), which facilitates a connection for one or more clients 120 with host 110. In another example, portal icons may be provided (e.g., on third-party venues, pre-installed on a computer or mobile device, etc.) to facilitate a communications connection between the host 110 and client 120.

Before continuing, it is noted that the host 110 is not limited in function. The host 110 may also provide other services to other computing or data processing systems or devices in the system 100. For example, host 110 may also provide transaction processing services, email services, etc.

In addition, the host 110 may be operable to communicate with at least one information source 140. The source 140 may be part of the service 105, and/or the source 140 may be distributed in the network 130. The source 140 may include any suitable source(s) for information about various components. For example, the source 140 may include manufacturer specifications, proprietary databases, public databases, and/or a combination of these, to name only a few examples of suitable sources. The source 140 may include automatically generated and/or manual user input. If the source 140 includes user-generated data, an appropriate filter may be applied, e.g., to discard "bad" data or misinformation. There is no limit to the type or amount of information that may be provided by the source 140. In addition, the information may include unprocessed or "raw" data. Or the data may undergo at least some level of processing.

The host 110 may execute analytics using the information from the source 140 to generate output for use in component substitution for device manufacture. For example, the host 110 receives information from the source 140 including environmental impact based on a cradle-to-grave assessment for various components. The host 110 may maintain the results in at least one data structure (e.g., a matrix or table or database) in computer-readable media 115. The data structure may be accessed by the host 110, which performs analytics based on input by the client 120, and outputs the results for the user at the client 110.

In an example, the host 110 performs the analytics described herein by executing database program code 150. The database program code 150 may include an analysis engine 152 and a query engine 154. In an example, the analytics engine 152 may be integrated into the query engine 154. The analytics engine 152 may be an SQL-based analytics engine, and the query engine 154 may be an SQL query engine. However, the operations described herein are not limited to any specific implementation with any particular type of database.

A system that implements component substitution for device manufacture as described herein has the capability to take a description of a system under consideration (e.g., in terms of inherent properties of the device), and assess the characteristics (e.g., price, environmental footprint, customer satisfaction, warranty) of the individual components comprising the system under consideration. The system may then output a list of substitute components and/or an assessment of various product designs. Component substitution may be better understood with reference to the following discussion of an example implementation of machine readable instructions.

Figure 1B:
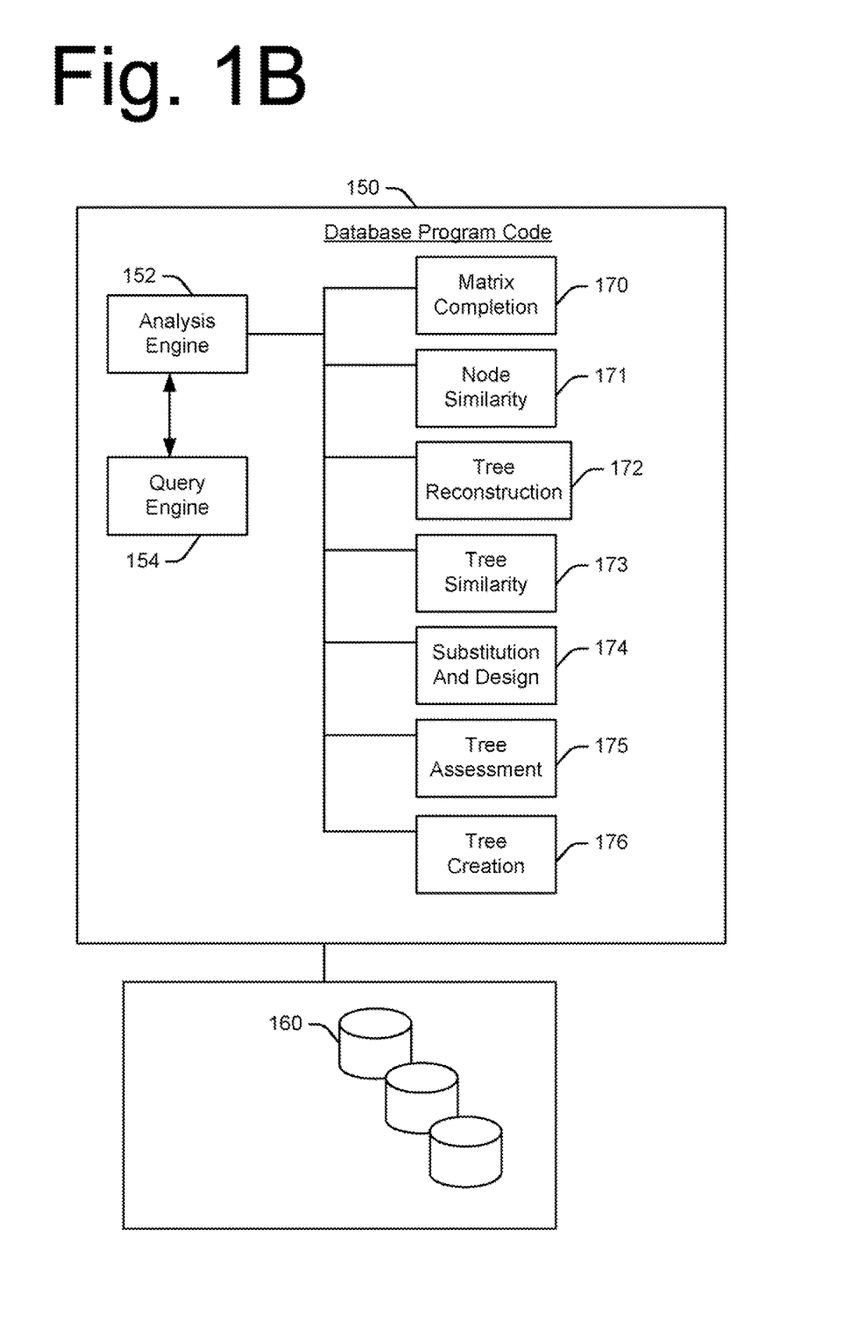
FIG. 1B shows an example architecture of machine readable instructions for database program code that may execute program code for determining sub-tree for component substitution.

FIG. 1B shows an example architecture of machine readable instructions for the database program code 150 which may execute program code for determining sub-tree similarity for component substitution. In an example, the database program code 150 may be implemented in machine-readable instructions (such as but not limited to, software or firmware) stored on a computer readable medium (e.g., storage 115 in FIG. 1A) and executable by one or more processor (e.g., on host 110 in FIG. 1A) to perform the operations described herein. The database program code 150 may perform operations on at least one database 160 (or other data structure). The database 160 may be provided on the same or different computer readable medium (e.g., storage 115 in FIG. 1A). It is noted, however, the components shown in FIGS. 1A and 1B are provided only for purposes of illustration of an example operating environment, and are not intended to limit execution to any particular system.

During operation, the analysis engine 152 may be operatively associated with the query engine 154 to execute the function of the architecture of machine readable instructions as self-contained modules. These modules can be integrated within a self-standing tool, or may be implemented as agents that run on top of an existing database. Existing data are used as seed data to populate a matrix. A comparison is then run between the device and the populated matrix using node comparison techniques (and related algorithms). After a set of similar nodes has been identified, trees are constructed to identify the structure resident within the similar nodes. The constructed tree is then compared to the system tree. When a similar tree (or set of trees) has been identified, the tree(s) are assessed for one or more parameter (e.g., environmental footprint). In an example, one or more node (e.g., portions of trees or even entire trees) may be substituted in the system tree. For example, the offending node(s) may be replaced with potentially better rated nodes, and also assessed to identify a better rated tree. The highly-rated tree(s) are used to mine the populated matrix for novel sub-trees from other devices, which may lead to a better rated solution.

In an example, the architecture of machine readable instructions may include a matrix completion module 170. The matrix completion module 170 may populate the database with information related to various devices. The information may include price and environmental impact, among other characteristics. Existing data from commercial databases, published literature, or internal systems may be used as seed data. The seed data is then expanded through one or more of data mining, knowledge discovery, regression, and/or other techniques. In this manner, only a few starting points of readily available data are used initially, and more comprehensive information can be constructed for the database.

The architecture of machine readable instructions may also include a sub-tree similarity module 171. The sub-tree similarity module 171 may be used to identify relevant characteristics of the device being assessed. These characteristics may be relevant to at least one of the parameters. For example, the published energy use rate for the device is directly related to environmental impact. But the characteristics may also include part name, part number, composition of the device, etc. The relevant characteristics of the device are then compared to the matrix of information in the database to identify any similar nodes. These nodes may be considered to be similar at the root (e.g., two different laptop computers), or similar in terms of other relational characteristics (e.g., a computer housing and a printer housing).

The architecture of machine readable instructions may also include a tree reconstruction module 172. After a group of related nodes have been identified, the tree reconstruction module 172 further outlines how the identified nodes are structurally related to one another. In an example, a root node is detected or inputted, and then the remaining nodes are identified as children or non-children of the root node. Based on the identified children nodes, a hierarchical structure may be generated which is used to construct a tree.

The architecture of machine readable instructions may also include a tree similarity module 173. After constructing a tree of relevant nodes from the populated matrix, this tree is then compared to the system tree. The system tree may be assessed, and a bill-of-materials developed for the device. Examples of methods to identify metrics for comparing two trees, include but are not limited to, tree depth, breadth, and distance between relative nodes. The output may include a similarity rating relative to identified trees of relevance in the populated matrix.

The architecture of machine readable instructions may also include a tree substitution and design module 174. After two or more trees of relevance have been identified, opportunities to replace "offending" nodes in the system tree may be sought. For example, a laptop computer may be identified as being similar to another laptop computer stored in the database. Suppose the processors of each laptop computer are identified as the offender. Then, if the processor of another laptop computer tree has a lower environmental footprint than the processor in the system tree, the processor node in the other laptop tree may be substituted for the processor node in the system tree. The new system tree results in a laptop computer having a lower environmental footprint. Next, the tree substitution and design module moves on to the next highest offender (e.g., the hard disk drive node), and the process repeats. The output results in a new tree for the device having a lower environmental footprint.

The architecture of machine readable instructions may also include a tree assessment module 175. The tree assessment module 175 may be used to assess a device, rather than redesign the device. In an example, the total environmental footprint of the tree may be calculated based on the similarity metrics identified by the tree similarity module. Methods to rapidly calculate the footprint of very large trees based on a hierarchy of nodes with similar grouping may be utilized. The output of the tree assessment module may include an estimated environmental footprint of the system tree. Additional metrics of relevance may also be output. For example, additional metrics may include but are not limited to, the minimum calculated environmental footprint of substitutive trees, the most similar tree with a lower environmental footprint, and the average footprint of all relevant trees.

The architecture of machine readable instructions may also include a tree creation module 176. The tree creation module 176 utilizes output from the other modules (e.g., the tree reconstruction module 172 and the tree substitution module 174) to create new trees. The fundamental principle is that different systems may perform similar functions, but not necessarily be previously viewed in similar fashion. For example, a server computer may use a particular component hierarchy in the supply chain that is also relevant to a laptop computer. But the manufacturer may not have considered such a hierarchy for numerous reasons, not the least of which is the manufacturer's own belief that server computers are different than laptop computers.

It is noted that the functional modules are shown for purposes of illustration. Still other functional modules may also be provided. In addition, the functional modules may be combined with one another.

As noted above, the database 160 may store at least one tree with a plurality of nodes. Each node in the tree represents at least one characteristic of a device. For example, the database 160 may include a tree for a new computer. The new computer tree 250 may include nodes for the motherboard, the hard disk drive, the keyboard, and the display. The motherboard node may include information about cost, e.g., at least one of price, environmental impact, performance, product warranty, and customer satisfaction, among other characteristics of the motherboard.

Figure 2A:
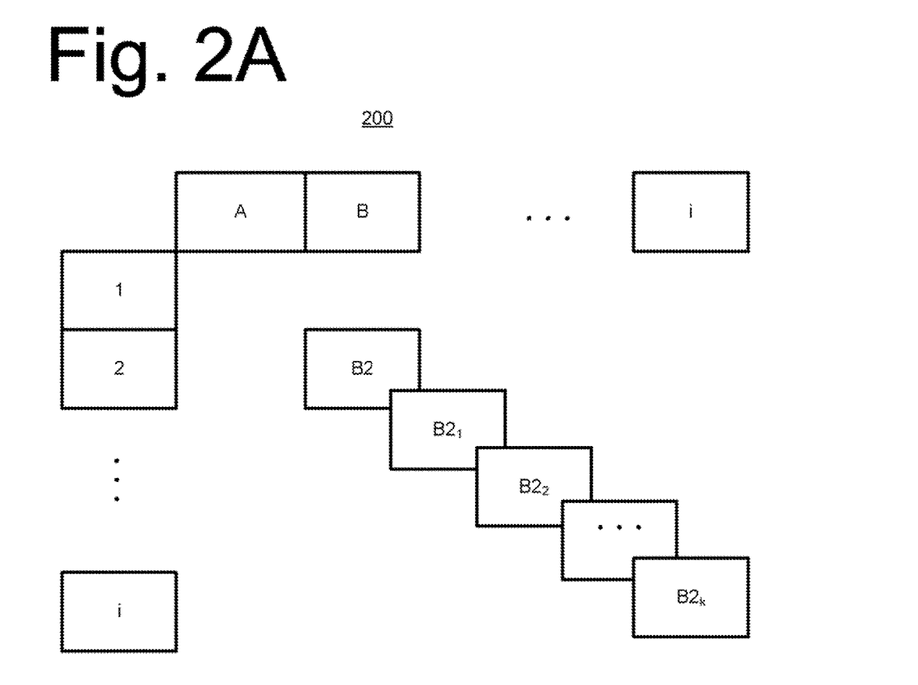
FIG. 2A illustrates an example multidimensional data structure.

In an example, the database 160 may be a multidimensional data structure. FIG. 2A illustrates an example multidimensional data structure. In this example, the database is configured as a matrix 200 with information for each node. Example information may include, but are not limited to the following characteristics: price, environmental impact, performance, product warranty, and customer satisfaction, to name only a few examples.

In FIG. 2A, the matrix 200 includes a plurality of columns (A, B, . . . i) and a plurality of rows (1, 2, . . . j). The intersection of each row and column may be referenced by the combination of row label and column label. For example, the intersection of column B and row 2 may be referred to as B2. In an example, each row corresponds to a component, and is thus used to generate the nodes in trees. The columns correspond to characteristics for the components. In an example where column B is for a computer display and row 2 is for environmental impact, the intersection B2 may include environmental impact information (e.g., overall carbon footprint) for the computer display.

The matrix 200 is not limited to the two-dimensional example given above. In another example, the program code may go to the intersection B2, and then read forward/backward in a third dimension to obtain more detailed environmental impact information included in the overall carbon footprint calculation, such as but not limited to, energy use, toxic emissions, and waste disposal. For purposes of illustration, the addresses in the third dimension may be referenced using any suitable symbols, such as subscripts, wherein the address is $B2_1$, $B2_2$, . . . $B2_k$.

The information in the multidimensional data structure may be included in, or referenced by the nodes in the trees. For example, a printed circuit board node may reference intersection B2 in the matrix 200 for environmental impact information related to that particular printed circuit board. It is noted that multiple nodes in different trees may reference the same address in the same matrix 200. By way of illustration, the printed circuit board nodes in a plurality of different computer trees may each reference the intersection B2 in the same matrix 200, if intersection B2 includes information for environmental impact that is the same for each printed circuit board.

Figure 2B:
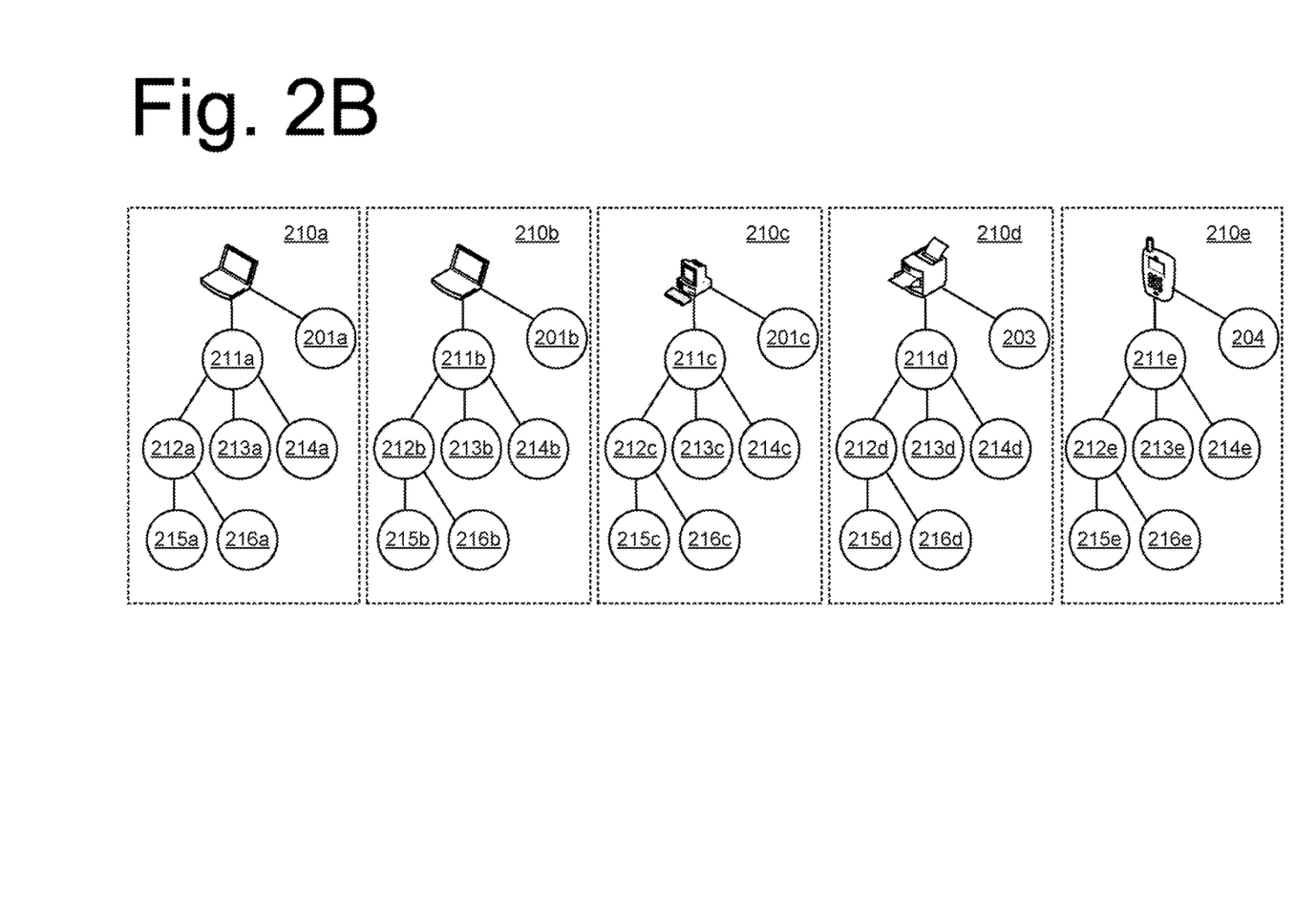
FIG. 2B illustrates a plurality of tree structures that may be provided in the data structure.
Figure 2C:
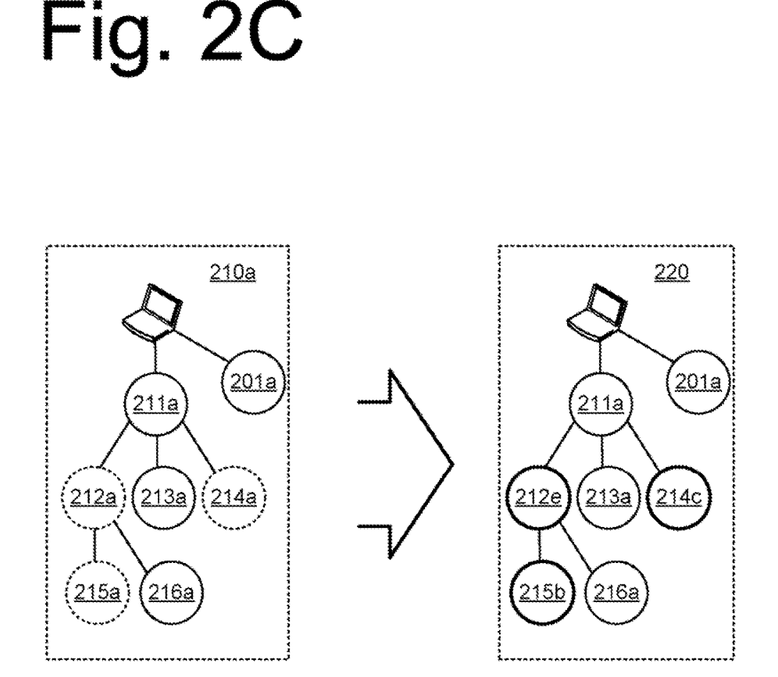
FIG. 2C shows an example of a new system tree.

The matrix 200 shown in FIG. 2A is shown and described herein as an example data structure that may be used to generate the tree structures shown in FIGS. 2B and 2C. It is noted, however, that the tree structures may be based on information provided in any suitable format(s).

The tree structure provided in the database may be better understood from the following discussion with reference to FIG. 2B. FIG. 2B illustrates a plurality of tree structures 210*a-e* that may be provided in the database. The trees 210*a-e* each have a plurality of nodes. Each node in the tree 210*a-e* may further include subnodes, thereby defining a child-parent relationship between the nodes, and providing additional layers of granularity for the components.

For purposes of illustration, the tree structures 210*a-c* are for computer devices. It is noted that any suitable number and type of other trees may be also used. For example, tree structure 210*d* is for a printer, and tree structure 210*e* is for a mobile phone. Accordingly, nodes that are suitable for substitution may be found in system trees that are not necessarily related to one another in a conventional sense. For example, a computer is different than a printer in most regards, which is different than a mobile phone. But there may be overlap in at least one of the nodes. For example, computers, printers, and mobile phones all have in common a processor, some degree of memory, and a housing.

In this example, all of the trees 210a-e (even the printer and mobile phone trees) include motherboard nodes 211a-e, in addition to nodes for other components. At least some of the other component nodes may be related in the different trees (e.g., nodes 201a-c are related). At least some of the other component nodes may not be related in the different trees (e.g., node 203 for ink cartridges in the printer tree 210d and node 204 for the antenna in the mobile phone tree 210e).

Continuing with this example, motherboard nodes 211a-c may include subnodes 212a-c for the circuit boards, subnodes 213a-c for the onboard memory, and subnodes 214a-c for the processors. These subnodes are each related to the respective motherboard nodes 211a-c as child nodes. Furthermore, the child nodes may also have child nodes of their own. For example, the circuit board nodes 212a-c may include child nodes 215a-c for the wafer and child nodes 216a-c for the metal traces.

During operation, program code (e.g., the database program code 150 in FIGS. 1A and 1B) is executed to create a system tree (e.g., system tree 210a in FIG. 2B) for a new system (e.g., a new laptop computer). The program code is also executed to identify and analyze other trees (e.g., system trees 210b-e). In an example, the program code traverses the trees and detects at least one root node in each of the trees. For example, the program code may compare nodes of the new system tree 210a with laptop/netbook computer trees 210b, desktop computer trees 210c, printer trees 210d, and mobile phone trees 210e. Each of the trees may include root nodes for motherboards (nodes 211a-e in FIG. 2B). Root nodes may also be identified for one or more subnode. Accordingly, the motherboard node 211a (and/or the subnodes) in the system tree 210a for the new system is compared to the motherboard nodes 211b-e in the other trees 210b-e.

The program may also be executed to rate the nodes. The nodes may be rated based on information in the database (e.g., in matrix 200 in FIG. 2A), to determine the suitability of a substitution. In an example, a higher rating may indicate a better candidate for substitution than a lower rating (although the opposite may also be true). For example, the motherboard node 211b of one of the laptop/netbook computer trees 210b may be assigned a higher rating for price than the motherboard node in the desktop computer trees 210c, because the price of the motherboard in the netbooks is lower than the price of the motherboard in the desktop computers. The motherboard node of the desktop computer trees 210c may be assigned a higher rating than the netbooks for performance. But the motherboard node 211b of the laptop/netbook computer trees 210b may receive higher ratings than the desktop computer trees 210c for environmental impact, because the processor in the laptop/netbook computers is more energy efficient.

The processor in one type of laptop computer may be more energy efficient than the processor in another laptop computer, and therefore the motherboard node for one of the laptop computer trees 210b may receive a higher rating than the motherboard node for the other laptop computers in the same group of trees 210b. The ratings may also be weighted. For example, environmental impact may receive a higher weighting if environmental impact is more pertinent to the user than price.

After a suitable substitution is determined, the program code may further be executed to create a new tree for the new system using node replacement or substitution based on nodes and/or subnodes in other trees. FIG. 2C shows an example of a new system tree 220. In this example, the new tree 220 is created from the tree 210a. But the new tree 220 is created with the node 215b from the laptop computer tree 210b because this node has the best rating for environmental impact. The new tree 220 is also created with the node 214c from the desktop computer trees, because this node has the best performance. The new tree 220 is also created with the node 212e from the mobile phone tree because this node has the lowest price.

It is readily appreciated from the above discussion that the systems and methods may be utilized to provide a quick assessment of a large amount of manufacturing information for a wide variety of different systems, and with high accuracy. The systems and methods may be used to modify device manufacture, e.g., by reducing the price to manufacture, reducing the impact the device has on the environment, and reducing warranty calls, all while increasing customer satisfaction with the product. These considerations are particularly relevant for so-called "fleet" customers or enterprise customers who purchase in large quantities, and therefore carefully consider the many different impacts of their purchases.

In this regard, the systems and methods may be implemented as a product assessment service. For example, the systems and methods may be used by enterprises who demand emissions reduction or compliance with environmental goals and/or regulations. Many of these enterprises are turning to their vendors to help assess, monitor, and reduce their environmental footprint. The systems and methods not only enable manufacturers to competitively reduce the environmental footprint of their customers, but to also competitively reduce the environmental footprint of their own supply chain.

These considerations are also relevant to consumers who are becoming more conscious of the impact their own purchases have on the environment.

In addition to environmental impact, the systems and methods also provide the foundation for significant savings, both direct (e.g., supply-side) and indirect (e.g., reducing warranty calls). The ability to automate product analysis may be a differentiator for some manufacturers in reducing price for smaller customers, and scaling to meet the demands of larger customers, while maintaining or even growing profit margins.

Figure 3A:
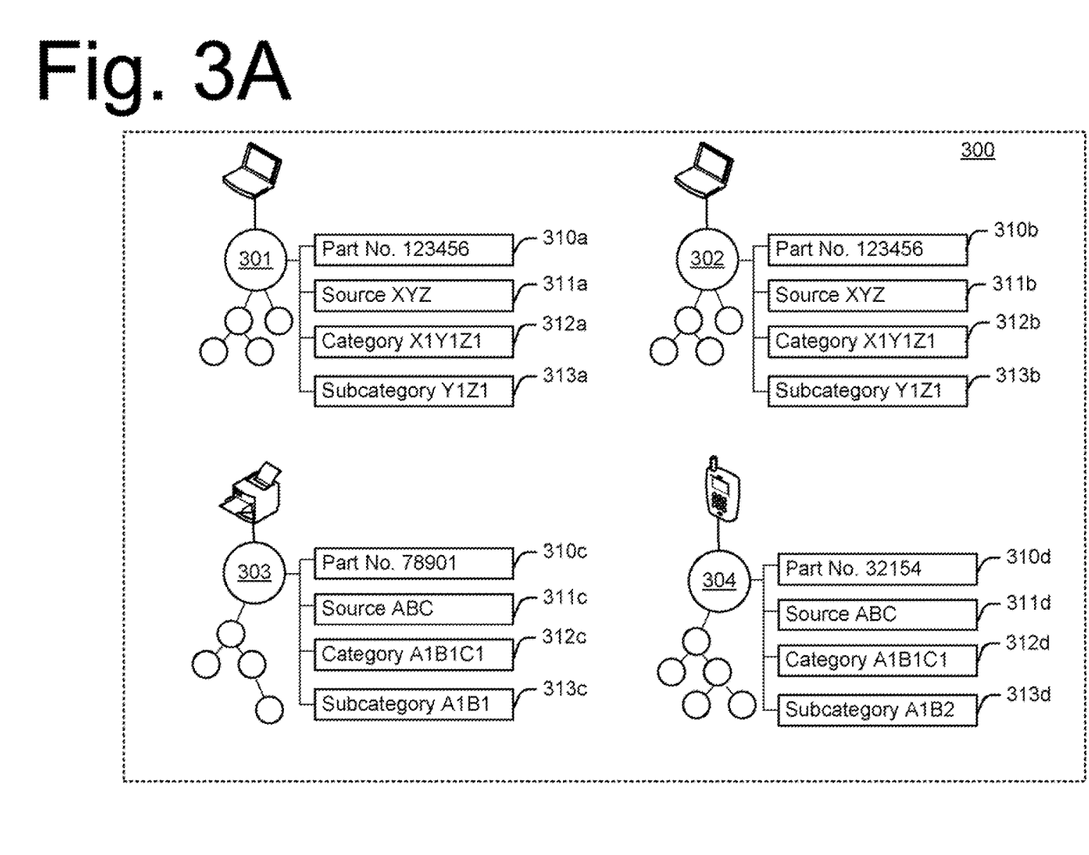
FIGS. 3A-3B show an example of determining sub-tree for component substitution.
Figure 3B:
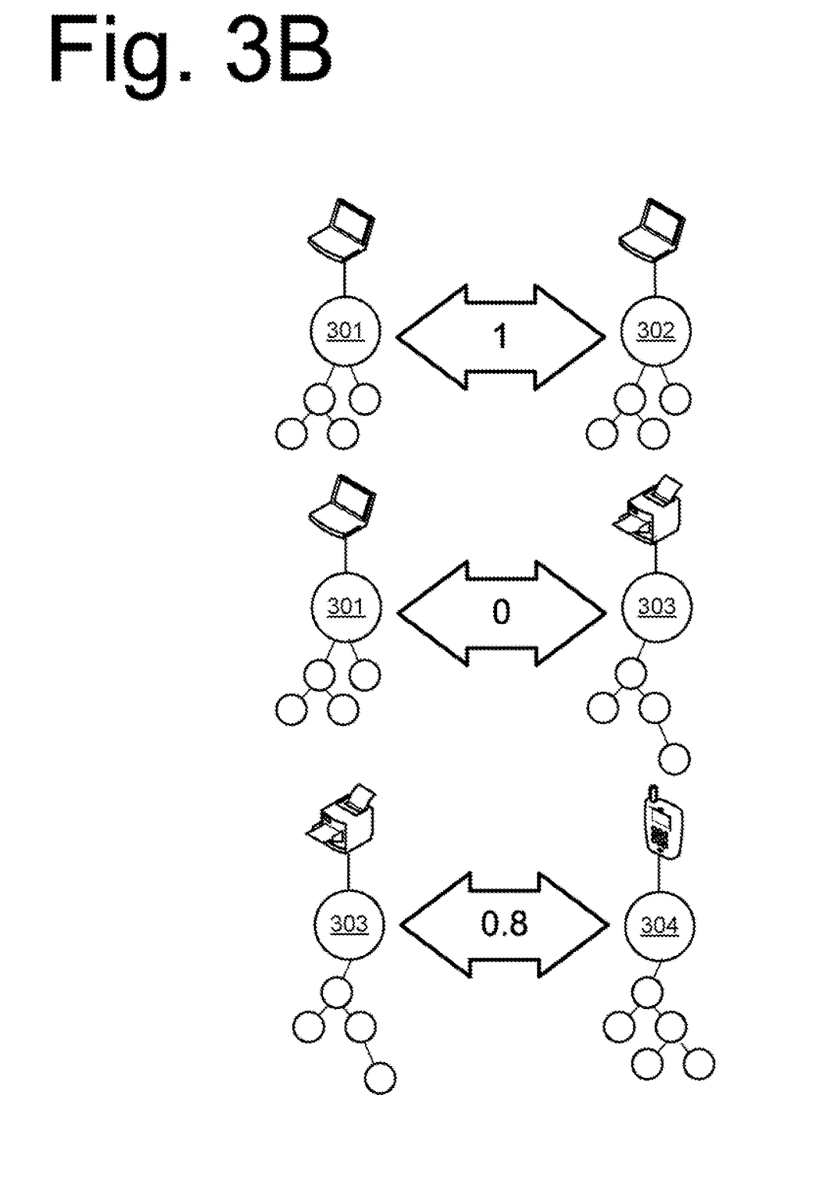

FIGS. 3A-3B show an example of determining sub-tree similarity for component substitution. In this example, each entity in the database is referred to as a plurality of related nodes or sub-trees 300. Each node of the sub-trees 300 is associated with a set of attributes. The attributes (illustrated by 310a-d, 311a-d, 312a-d, and 313a-d for nodes 301-304, respectively) may be numerical, discrete, categorical, textual description, visual, auditory, etc. Examples of some attributes include, but are not limited to: database source, part number, part name, part description, category, subcategory, trees containing that sub-tree, images, etc. The object is to estimate a normalized similarity metric between any two sub-trees belonging to the same or different databases.

More detailed correlation techniques are described in detail below. For now it is sufficient to understand that attributes may be analyzed, for example, by comparing at least one measurable aspect. Non-limiting examples are comparing text using the longest common string correlation for correlating text strings, and pixel correlation for correlating pictures.

A similarity metric of one indicates a match (e.g., the same sub-tree or sub-trees that are interchangeable). For example, the sub-trees including nodes 301 and 302 for the processor of two different laptop computers are assigned a similarity metric of one because all of the nodes in the sub-trees associated with nodes 301 and 302 are identical (all attributes match; 310*a*=310*b*, 311*a*=311*b*, etc.). A similarity metric of zero indicates no correlation (e.g., in no situation can one sub-tree substitute for the other). For example, the sub-trees including nodes 301 and 303 for the laptop and printer are assigned a similarity metric of zero because the motherboards are not interchangeable (no attributes correlate). Intermediate values between 0 and 1 indicate various degrees of similarity between the nodes. For example, sub-trees including nodes 303 and 304 for the printer and a mobile phone are assigned a similarity metric of 0.8 because there are sufficient components on the motherboards of each that have sufficient common attributes, making the motherboards interchangeable for some uses (some attributes correlate).

Knowledge of similarity between two sub-trees also enables a corresponding distance metric to be estimated. For example, if "s" represents similarity, then "1−s" or "1/s" or other similar mappings may be used to represent a distance metric between sub-trees. Since one can be derived from the other, the discussion herein refers to similarity and distance metrics interchangeably.

Such a tree consists of nodes arranged in a specific topology. In correlating two trees, depending on the context, either the nodes, or the topology or both are correlated. For example, if both the nodes and the topology of two trees exactly match then their similarity is one in all situations. However, in some situations it may be sufficient to only focus on correlating the nodes to estimate their similarity, regardless of the topology of the two trees. In general, the similarity (distance) between two trees is a combination of their similarity (distance) in both the nodes and topology. In one example, the similarity may be expressed as the average of the two similarity metrics. For example, similarity may be expressed as follows:

$$S(T1,T2)=(\tfrac{1}{2})*(S_{node}(T1,T2)+S_{topo}(T1,T2))$$

Or for example, similarity may be expressed as a normalized weighted average as follows:

$$S(T1,T2)=(1/(w1+w2))(w1*S_{node}(T1,T2)+w2*S_{topo}(T1,T2))$$

In the most general case, similarity may be expressed as any function of the two similarity metrics as follows:

$$S(T1,T2)=f(S_{node}(T1,T2),S_{topo}(T1,T2))$$

where the range of f( ) is normalized between 0 and 1.

In order to compute $S_{node}$ and $S_{topo}$, one or a combination of the following techniques may be employed.

For purposes of illustration, three techniques of estimating similarity between sub-trees are described in detail below. It is noted, however, that the systems and methods are not limited to implementation by any particular technique. Other suitable techniques will also be readily apparent to those having ordinary skill in the art after becoming familiar with the teachings herein. In addition, any of these and/or other techniques may be combined in any of a wide variety of ways, with the possibility of one or more being used simultaneously with the user combining the results together to arrive at a similarity number, e.g., by weighted sum.

In a first example, a domain-based rules technique may be employed. This technique uses domain knowledge about the databases, the sub-trees within the databases, and any available contextual information, to construct a set of rules. The rules may then be used to determine the similarity between two sub-trees. For purposes of illustration, a simple rule may be defined such that two sub-trees from the same or substantially similar data source and having the same or substantially similar part numbers for the root nodes are assigned a similarity of one. Other rules could exploit specific knowledge of attributes of the root node, child nodes, or the topology of the tree.

In a second example, an attribute-based similarity metric may be employed. Multivariate attributes, typically available for each sub-trees, are used to compute a similarity metric. The final similarity metric comprises the similarity in each individual attribute. For purposes of illustration, the final similarity metric may include the weighted sum of the similarity of each of the attributes. The similarity function for each attribute may be defined by a domain expert. For example, similarity between string attributes may be computed from the longest common subsequence (LCS) correlation. In another example, similarity may be based on longest common prefix (LCP). In another example, similarity may be based on a combination of LOS and LOP. In yet another example, similarity may be computed using Levenshtein distance between strings. Other string correlating algorithms may also be used. For example, similarity between numeric attributes may be computed using Minkowski distance.

The similarity of the individual nodes can be combined together to determine the similarity metric between all the nodes. The edit distance between the trees can be considered to estimate the similarity between the topology of two trees.

The manner of combining the similarity of attributes may also be based on domain knowledge (e.g., determining the weights, if the weighted sum is used). The similarity of attributes may also be based on the usage scenario of the similarity metric.

In one example, the similarity metric between two nodes may be determined as follows:

$$S(T1,T2)=(1/Z)\Sigma Wi*si(A1i,A2i)$$

where:
S( ) is the sub-tree similarity function;
T1, T2 are the sub-trees;
Wi is the weight assigned to the ith attribute similarity;
si( ) is the function that computes the similarity between the sub-trees' ith attribute;
A1*i*, A2*i* are the ith attributes of the two sub-trees, respectively; and
Z is a normalization constant.

The similarity metric between two sub-trees may be determined using cosine similarity to compare two vectors of attributes. The similarity metric may be determined as the dot product between the two attribute vectors, divided by the magnitude of both the vectors, as follows:

$$S=(A1\cdot A2)/(|A1||A2|)$$

In a third example, a model-based similarity metric may be employed. In this technique, the similarity between two sub-trees is based on data that is available, such as but not limited to: textual descriptions of each of the sub-trees, a large number of trees consisting of the sub-trees, data where similarity between sub-trees is already known (e.g., has been assigned manually by a domain expert).

In an example, if text descriptions of the sub-trees are available, topic models may be constructed for each sub-trees. These models may then be compared to determine the similarity between the sub-trees.

In another example, if a large number of trees are available, contextual metrics may be computed for each sub-tree. These metrics pertain to the proximity of other nodes to a given sub-tree. For example, if the parent and children of two nodes are always the same, sub-trees having those nodes are likely to have a high similarity to one another.

In another example, a "labeled" data set is already available. In other words, the similarity between any two sub-trees in the data set is known. Such a data set can be used for training a machine learning model. The input to the model includes "features" extracted from the node or topology attributes of the sub-trees. The output is the similarity metric. A trained model, which has learned the relationship between the sub-tree features and the similarity metric, may be used to determine the similarity between two new sub-trees for which the similarity is not known, but the same features can be extracted from their attributes.

Note that, the similarity metric does not have to be symmetric. That is, S(T1, T2)≠S(T2, T1), where S( ) denotes the similarity function, and T1, T2 are two sub-trees. Because S(T1, T2) denotes the substitutability of T1 with T2, T1 with T2 may not always be the same as the substitutability of T2 with T1. Indeed, if all attributes of T1 are subsumed in T2, then T2 may be able to replace T1, but not vice-versa. That is, S(T1, T2)=1, while S(T2, T1)<1 or even 0.

After selecting at least one of the techniques for determining similarity (or distance) metric, the technique(s) may be used to compute the similarity between any two sub-trees in a database. The similarity may then be used to construct a distance matrix between sub-trees of the database. The matrix can then be used to perform cluster (or group) analysis. The resulting clusters may be manually labeled by a domain expert. Clustering may also be used to approximate correlation of sub-trees in two difference databases that do not share common attributes. Both databases may be separately clustered, and the clusters manually labeled for use. Thus, the task of correlating nodes is reduced to correlating the cluster labels of the two databases.

Before continuing, it should be noted that the examples described above are provided for purposes of illustration, and are not intended to be limiting. Other devices and/or device configurations may be utilized to carry out the operations described herein.

Figure 4:
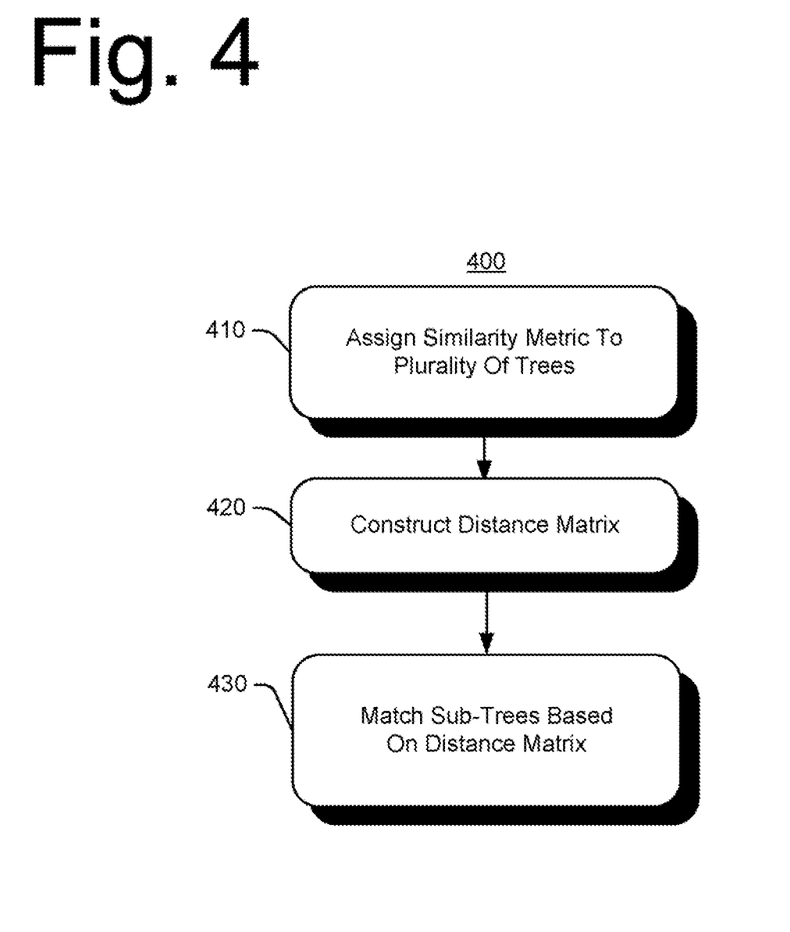
FIG. 4 is a flowchart illustrating example operations of determining sub-tree for component substitution.
Figure 5:
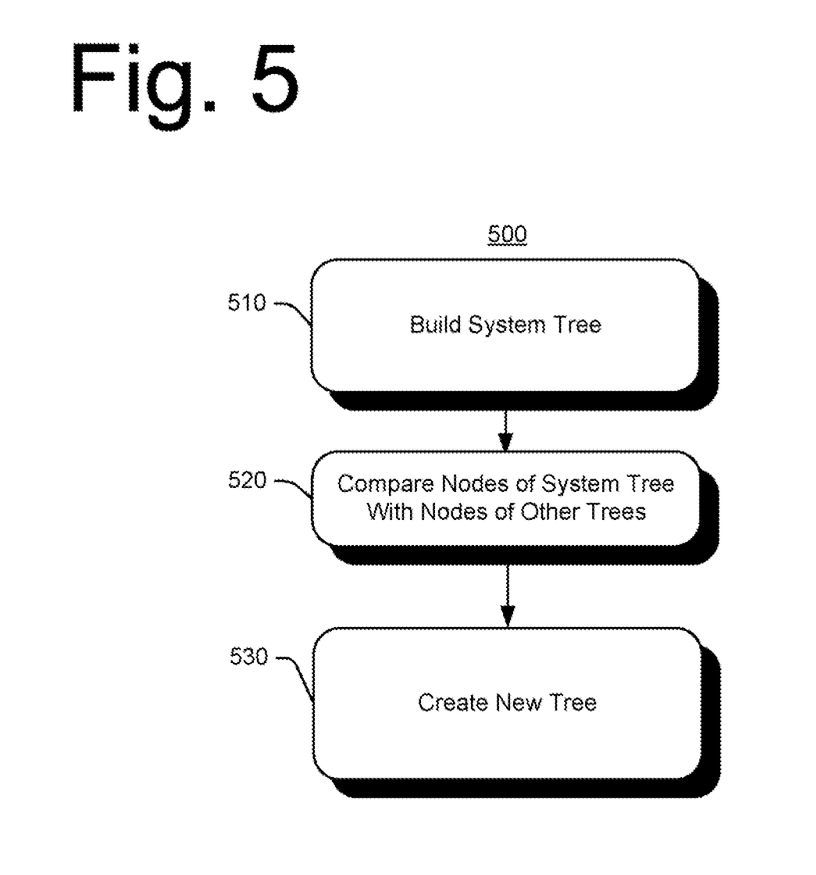
FIG. 5 is a flowchart illustrating example operations of component substitution which may be implemented.

FIGS. 4 and 5 are flowcharts illustrating example operations which may be implemented for device manufacture. Operations 400 and 500 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

FIG. 4 is a flowchart illustrating example operations of determining sub-tree similarity for component substitution. In operation 410, a similarity metric is assigned to a plurality of trees stored in computer-readable media. In operation 420, a distance matrix is constructed in computer-readable media, the distance being between sub-trees. The sub-trees may be compared using at least one of: domain based rules, attribute based similarity metrics, and machine learning. Domain-based rules may use domain knowledge to construct a set of rules based on node attributes. Attribute based similarity metrics may be determined based on multivariate attributes for each node. Model based similarity may be determined based on available node data.

In an example, a similarity score of one indicates interchangeable nodes. A similarity score of zero indicates no correlation. In operation 430, sub-trees are correlated (e.g., even between trees without common attributes) based on the distance matrix. Accordingly, the similarity score may be used to compute similarity between any sub-trees in a database. As already noted above, the similarity score may be asymmetric.

The operations discussed above are provided to illustrate various examples of determining sub-tree similarity for component substitution for device manufacture. It is noted that the operations are not limited to the ordering shown. Still other operations may also be implemented.

For purposes of illustration, further operations may include rating the nodes based on respective similarity scores, and replacing the at least one of the common nodes in the system tree is based on the rating.

FIG. 5 is a flowchart illustrating example operations of component substitution which may be implemented. In operation 510, building a system tree having a plurality of nodes, each node in the system tree representing a characteristic of a component of the system under consideration. For example, a tree may be for a new laptop computer. The tree may include a motherboard node, a keyboard node, a hard disk drive node, and a display node. The keyboard node may further include a housing node, a cabling/wireless node, and a circuit board node. In this example, the keyboard node is the parent node and the housing node, cabling/wireless node, and circuit board node are child nodes of the keyboard node. Any degree of granularity may be utilized based at least to some extent on design considerations (including desired output, and time to process).

In operation 520, comparing nodes of the tree with nodes in other trees to identify common nodes (or root or similar node). Continuing with the example from operation 510, the tree for the new laptop computer may be compared with trees for other computers, such as other laptop computers, netbook computers, desktop computers, servers, server blades, etc. The common node may be the keyboard node in each of these other trees. Or the common node may be the circuit board child node for the keyboard node or even the motherboard node.

It is noted that, in this example, the tree for the new laptop computer may also be compared with trees for other, at least somewhat unrelated systems. For example, the processor or memory in a mobile phone may be a suitable substitute for the processor or memory in another system, such as a printer.

In operation 530, generating a new tree for the system under consideration by replacing at least one of the common nodes in the system tree with at least one of the nodes in the other trees. For example, the processor from another laptop computer may be substituted for the processor originally chosen for the new laptop computer to give the new laptop computer a lower environmental impact, lower price, higher customer satisfaction, longer warranty, etc. than the initial design for the new laptop computer may have delivered.

It is noted that various of the operations described herein may be automated or partially automated. For example, building system trees may be fully automatic using retrieval routines executed by program code. Alternatively, at least some user interaction may be provided. In such an example, the user may manually provide production specification(s), and then building system trees may be automatic based at least in part of the user-provided product specification(s). The level of user interaction may be any suitable degree. For example, the user may simply identify that the new system is to be an inkjet printer. Alternatively, the user may identify individual components of the inkjet printer, including but not limited to, the type of ink cartridges, processor speed, memory size, and paper tray options.

In an example, the component substitution operations may be implemented with a customer interface (e.g., web-based product ordering interface). The customer is able to make predetermined selections (e.g., specifying minimum processor speed), and the operations 510-530 described above are implemented on a back-end device to present the user with various designs that meet the customer's minimum expectations. The user can then further select which of the alternatives best suit the customers preferences (including, e.g., for price, environmental impact, customer satisfaction, and warranty).

Further operations may also include rating the nodes, wherein replacing the at least one of the nodes in the system tree is based on the rating of the nodes. For example, a processor having a higher energy efficiency rating may receive a higher ranking for environmental impact. A processor that is priced lower may receive a higher ranking for price. A processor that has a higher customer satisfaction may receive a higher ranking for customer satisfaction. The rankings may further be weighted. For example, if the user values a lower environmental impact above price, then the rating for environmental impact is assigned a higher weight than price.

Still further operations may also include populating a database with characteristics of a plurality of components. The characteristics of the components may include price, environmental impact of the components, customer satisfaction, warranty, and other characteristics dependent at least to some extent on design considerations. Some design considerations may include which characteristics are desired by the user, required by regulation, set forth in company policy, and used to meet manufacturing goals, to name only a few examples.

Still further operations may also include identifying structural relationships between the plurality of nodes in the system tree and the nodes in the other trees. For example, structural relationships may include, but are not limited to, parent-child nodes, and parent-grandchildren nodes.

Still further operations may also include determining at least one substitute component for the system based on the new tree. In an example, further operations may include outputting a bill of materials with the at least one substitute component based on the new tree. The bill of materials may be printed for a user (e.g., a consumer). In an example, the bill of materials may be vetted (e.g., by a design engineer) to ensure that any substitutions are appropriate. For example, a high-efficiency processor for a laptop computer may not be an appropriate substitution for a mobile phone.

It is noted that the examples shown and described are provided for purposes of illustration and are not intended to be limiting. Still other embodiments are also contemplated.

The invention claimed is:

1. A method comprising:
   determining, by a system comprising a processor and a non-transitory computer-readable storage medium, a similarity metric representing similarity between a plurality of trees stored in computer-readable media, wherein the determined similarity metric is based on similarities between all nodes of the plurality of trees and is computed based on combining the similarities of the nodes of the plurality of trees;
   constructing, by the system, a distance matrix including a distance between sub-trees of the plurality of trees based on the determined similarity metric;
   correlating, by the system, the sub-trees based on the distance matrix;
   rating, by the system, the sub-trees for a specified parameter;
   modifying, by the system, a first tree of the plurality of trees by substituting a first sub-tree in the first tree with a second sub-tree in a second tree of the plurality of trees, the substituting based on the rating and a similarity score representing a similarity between the first and second sub-trees; and
   use the modified first tree to modify a manufacture of a device represented by the first tree, wherein the use of the modified first tree causes use of a component represented by the second sub-tree in the manufacture of the device instead of use of a component represented by the first sub-tree.

2. The method of claim 1, wherein a similarity score of one between the first and second sub-trees indicates interchangeable sub-trees.

3. The method of claim 1, wherein a similarity score of zero between the first and second sub-trees indicates no correlation between the first and second sub-trees.

4. The method of claim 1, further comprising:
   using domain-based rules to determine similarity scores representing similarities between the sub-trees of the plurality of trees, wherein the domain-based rules include rules based on root node attributes, child node attributes, and topology of the plurality of trees.

5. The method of claim 1, wherein attribute based similarity is determined based on multivariate attributes of the sub-trees.

6. The method of claim 1, wherein model based similarity is determined based on available sub-tree data of the sub-trees.

7. The method of claim 1, wherein the similarity score is asymmetric.

8. The method of claim 1, wherein rating the sub-trees for the specified parameter comprises rating the sub-trees for an environmental impact parameter representing an environmental impact of a respective component represented by each respective sub-tree.

9. The method of claim 1, wherein rating the sub-trees for the specified parameter comprises rating the sub-trees for a performance parameter representing performance of a respective component represented by each respective sub-tree.

10. A system comprising:
   a non-transitory computer readable storage to store instructions and a system tree having a plurality of nodes, each of the plurality of nodes in the system tree representing a characteristic of a respective component; and
   a processor,
   wherein the instructions are executable on the processor to:
      determine a similarity metric representing similarity between a plurality of trees including the system tree, wherein the determined similarity metric is based on similarities between all nodes of the plurality of trees and is computed based on combining the similarities of the nodes of the plurality of trees;

construct a distance matrix including a distance between sub-trees of the plurality of trees based on the determined similarity metric;
correlate the sub-trees based on the distance matrix;
rate the sub-trees for a specified parameter;
modify the system tree of the plurality of trees by substituting a first sub-tree in the system tree with a second sub-tree in a second tree of the plurality of trees, the substituting based on the rating and a similarity score representing a similarity between the first and second sub-trees; and
use the modified system tree to cause modification of a manufacture of a device represented by the system tree, wherein the use of the modified system tree causes use of a component represented by the second sub-tree in the manufacture of the device instead of use of a component represented by the first sub-tree.

11. The system of claim 10, wherein a similarity score of one between the first and second sub-trees indicates interchangeable sub-trees, and a similarity score of zero indicates no correlation between the first and second sub-trees.

12. The system of claim 10, wherein the similarity score is used for cluster analysis.

13. The system of claim 10, wherein the instructions are executable on the processor to:
use domain-based rules to determine similarity scores representing similarities between the sub-trees of the plurality of trees, the domain-based rules including rules based on sub-tree attributes.

14. The system of claim 10, wherein attribute based similarity is determined based on multivariate attributes of the sub-trees.

15. The system of claim 10, wherein model based similarity is determined based on available sub-tree data.

16. A non-transitory storage medium storing instructions that upon execution cause a system to:
determine a similarity metric representing similarity between a plurality of trees, wherein the determined similarity metric is based on similarities between all nodes of the plurality of trees and is computed based on combining the similarities of the nodes of the plurality of trees;
construct a distance matrix including a distance between sub-trees of the plurality of trees based on the determined similarity metric;
correlate the sub-trees based on the distance matrix;
rate the sub-trees for a specified parameter;
modify a first tree of the plurality of trees by substituting a first sub-tree in the first tree with a second sub-tree in a second tree of the plurality of trees, the substituting based on the rating and a similarity score representing a similarity between the first and second sub-trees; and
use the modified first tree to cause modification of a manufacture of a device represented by the first tree, wherein the use of the modified first tree causes use of a component represented by the second sub-tree in the manufacture of the device instead of use of a component represented by the first sub-tree.

17. The system of claim 16, wherein the similarity score is used for cluster analysis.

* * * * *